July 8, 1958 J. J. MISKEL ET AL 2,841,937
MACHINE FOR ASSEMBLING DISPOSABLE CARTRIDGES
FOR HYPODERMIC SYRINGES
Filed Dec. 28, 1956 6 Sheets-Sheet 5

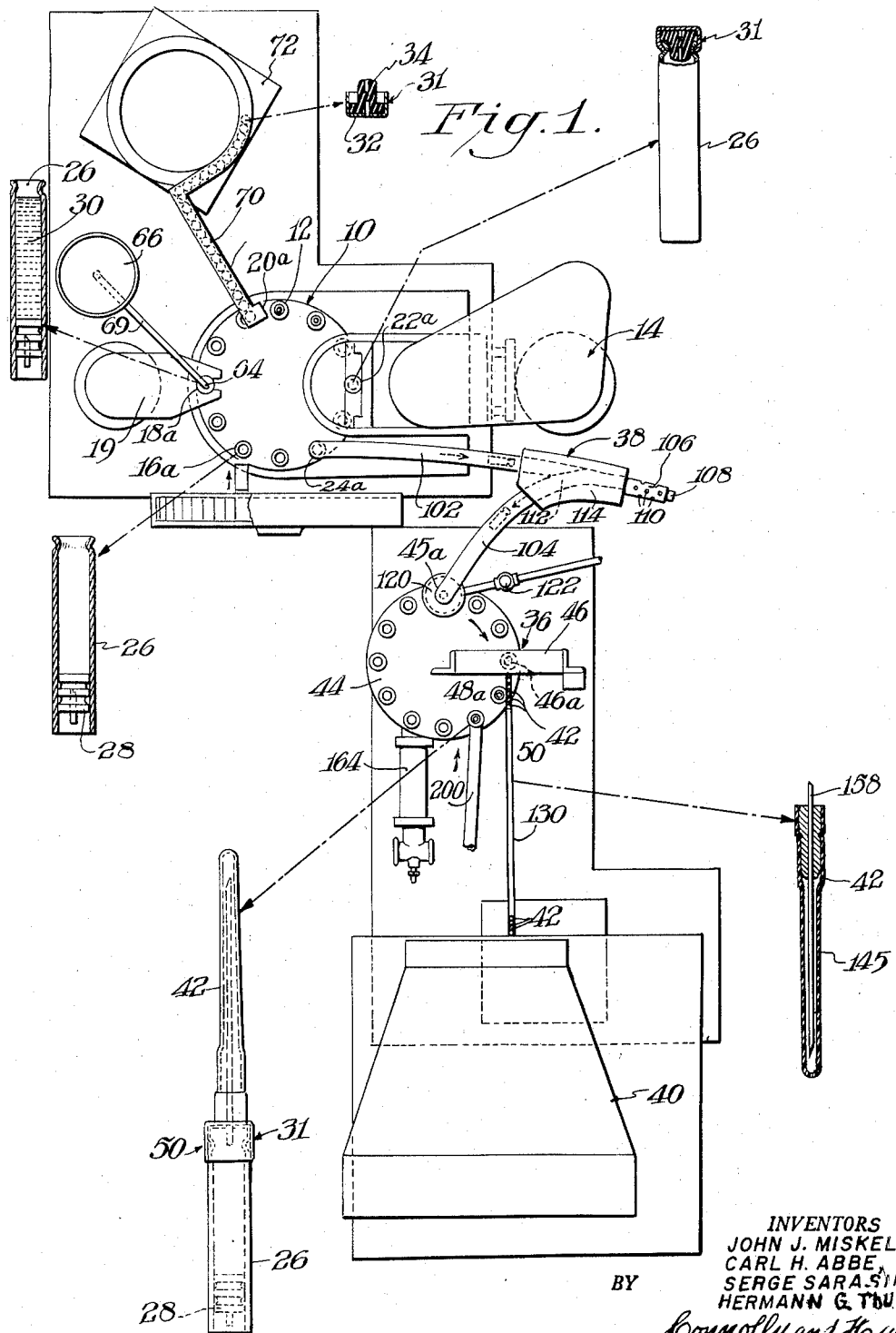

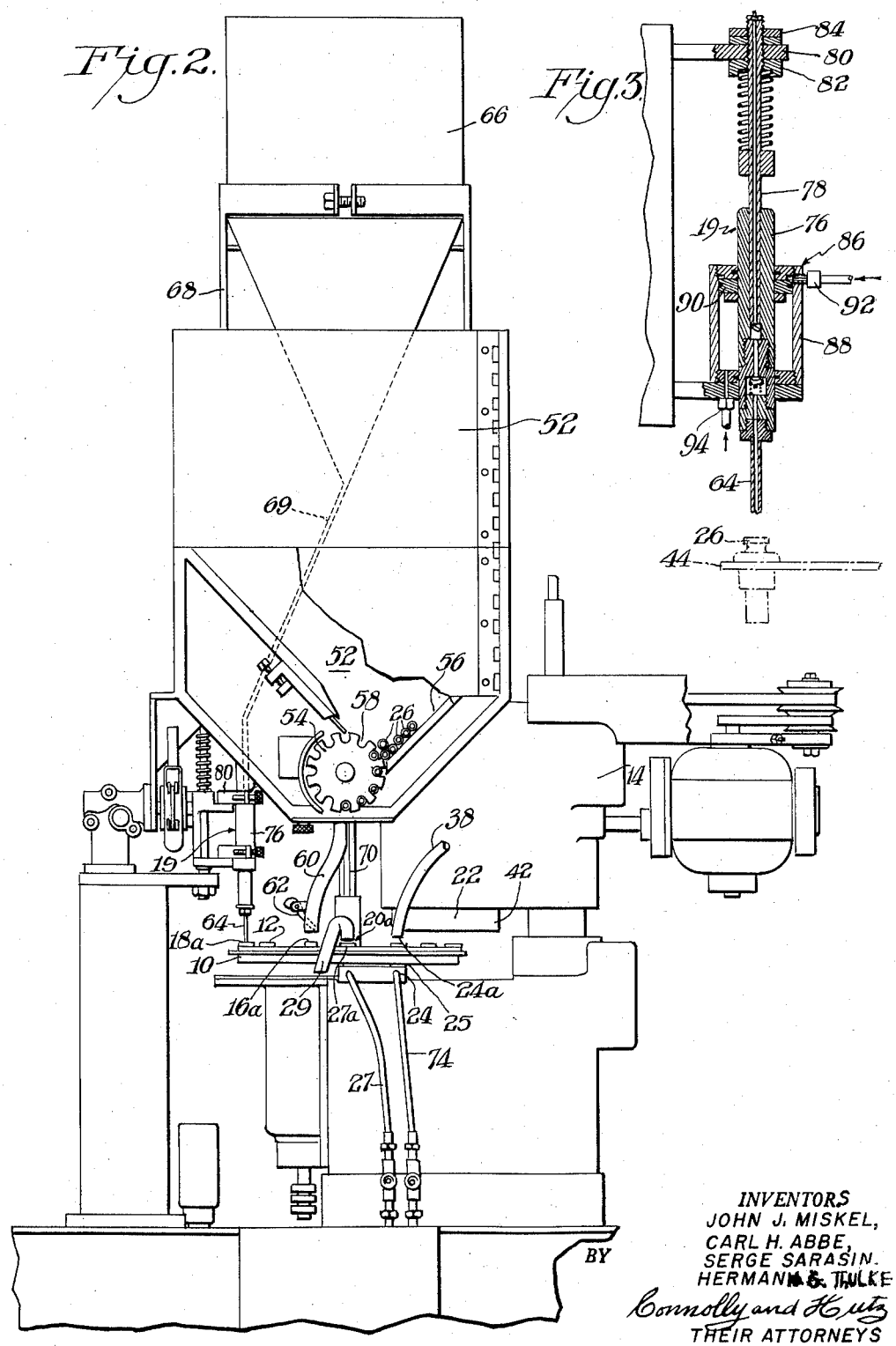

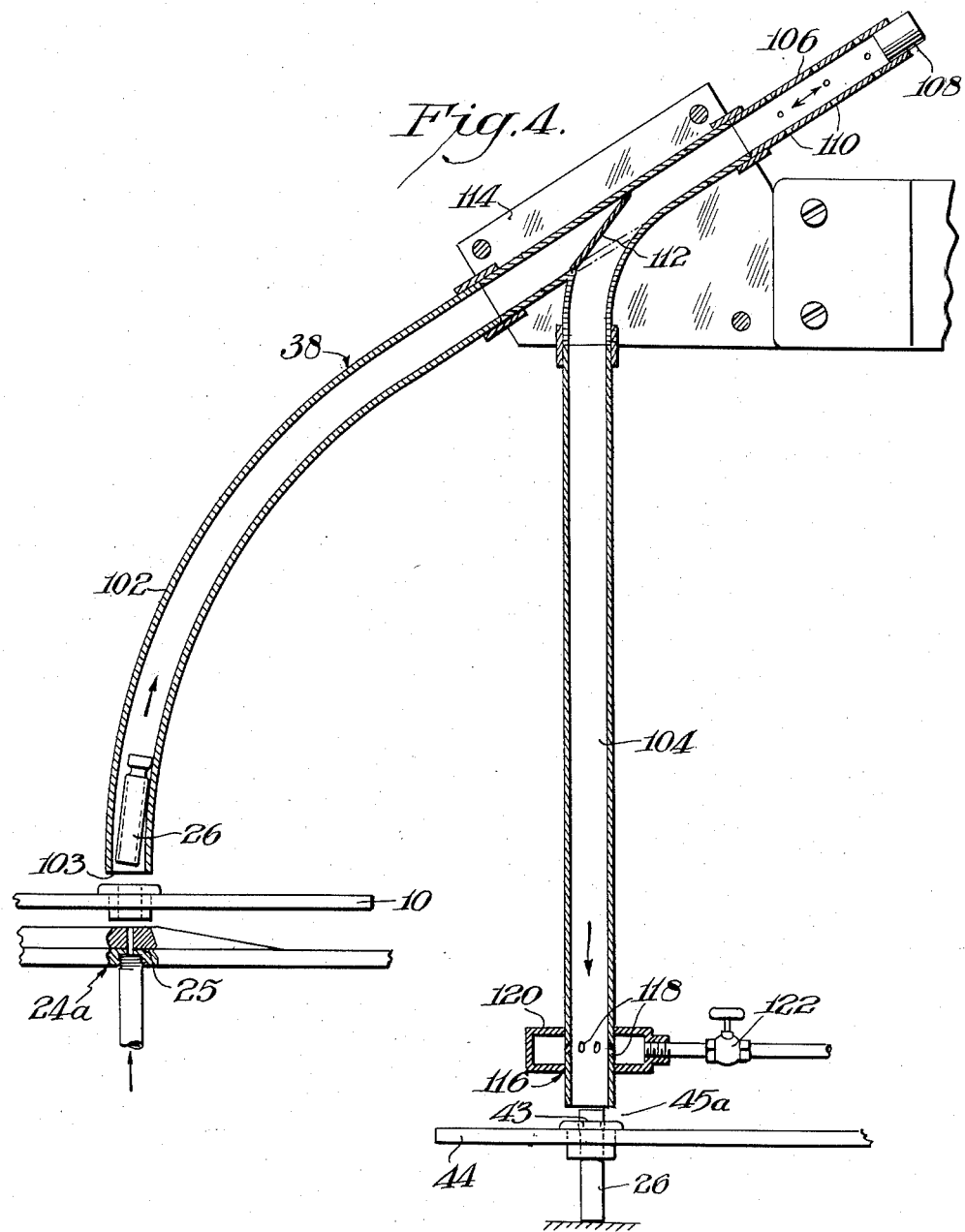

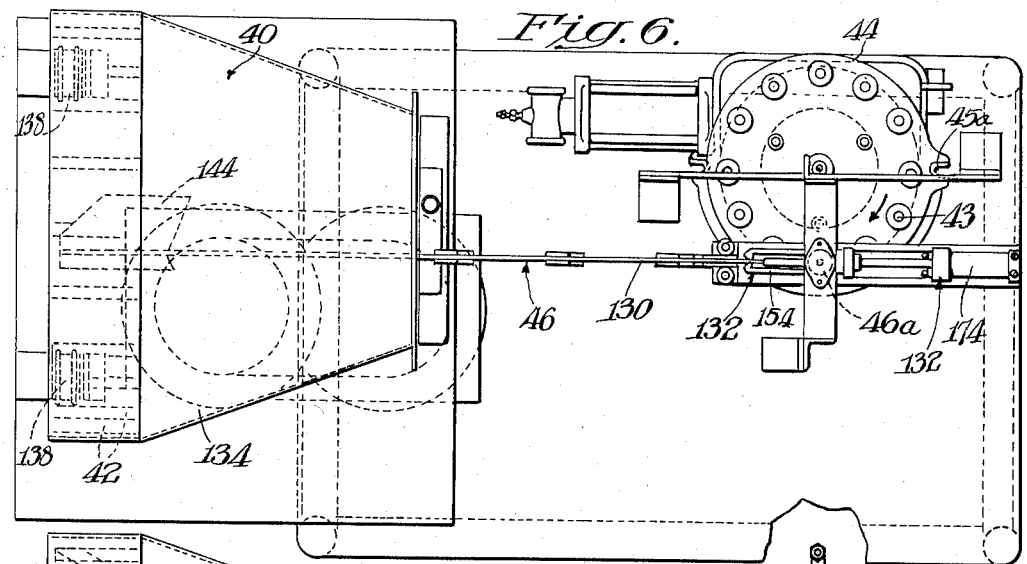
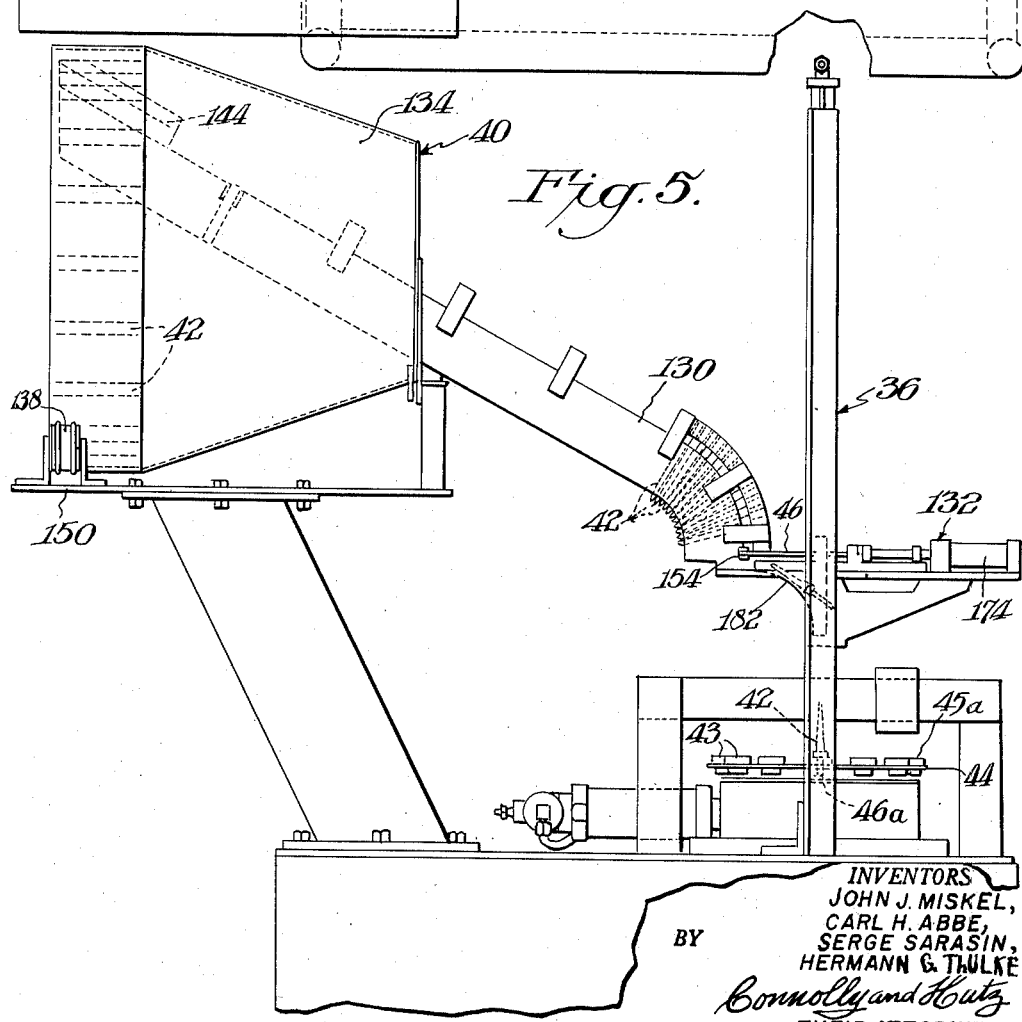

INVENTORS
JOHN J. MISKEL,
CARL H. ABBE,
BY SERGE SARASIN
HERMANN G. THULKE

Connolly and Hutz
THEIR ATTORNEYS

July 8, 1958  J. J. MISKEL ET AL  2,841,937
MACHINE FOR ASSEMBLING DISPOSABLE CARTRIDGES
FOR HYPODERMIC SYRINGES
Filed Dec. 28, 1956  6 Sheets-Sheet 6
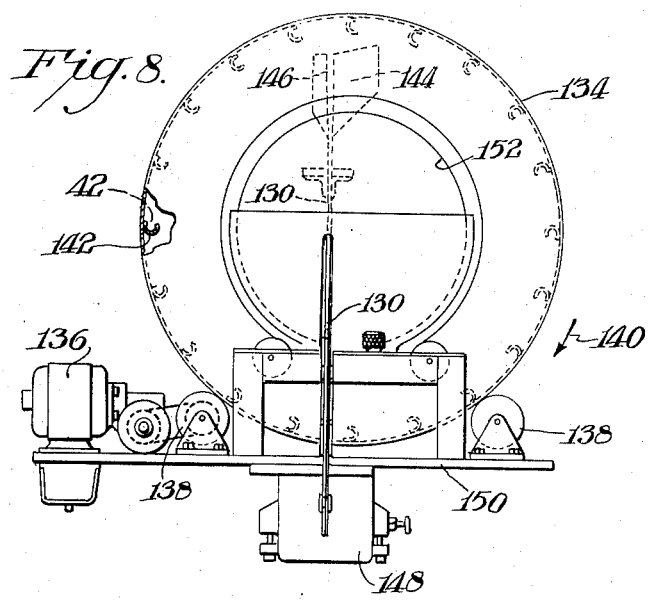
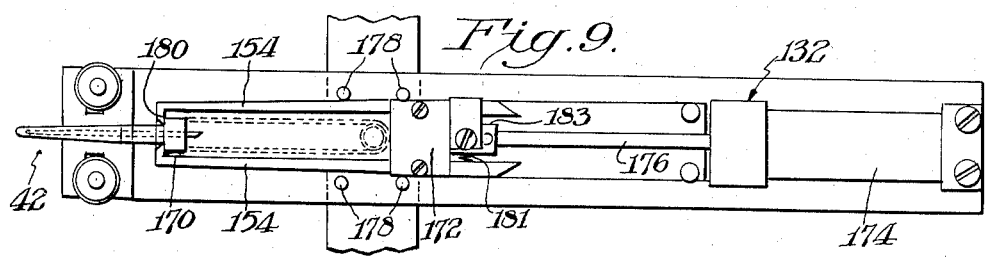
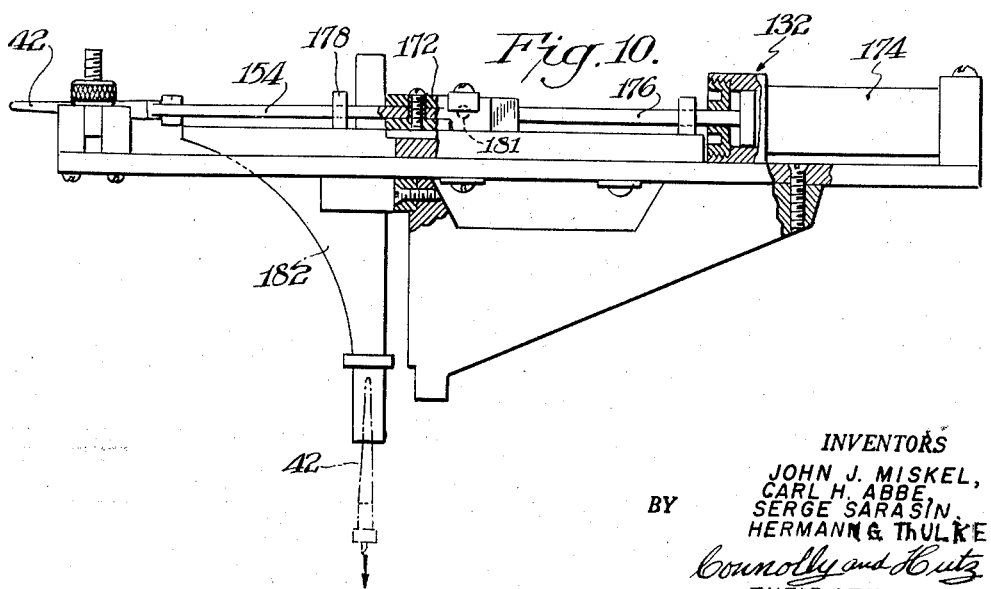
INVENTORS
JOHN J. MISKEL,
CARL H. ABBE,
BY SERGE SARASIN,
HERMANN G. THULKE
Connolly and Hutz
THEIR ATTORNEYS

United States Patent Office 2,841,937
Patented July 8, 1958

2,841,937

MACHINE FOR ASSEMBLING DISPOSABLE CARTRIDGES FOR HYPODERMIC SYRINGES

John J. Miskel, Brooklyn, Carl H. Abbe, Maspeth, Serge Sarasin, New York, and Hermann G. Thulke, Massapequa, N. Y., assignors to Chas. Pfizer & Co., Inc., New York, N. Y., a corporation of Delaware Application December 28, 1956, Serial No. 631,109

14 Claims. (Cl. 53—276)

This invention relates to a fully automatic machine for assembling disposable cartridges for hypodermic syringes, and more particularly to a machine for assembling cartridges including a plungered and sealed medicament-containing vial attached to an associated capped sterile needle.

Hypodermic syringes utilizing disposable medicament-containing cartridges have been found to be highly useful in situations where sterilization immediately before use is not practicable. An example of a disposable cartridge of this type is described in U. S. Letters Patent 2,737,949, issued on March 13, 1956. In order to reduce the expense of manufacture and assembly of these cartridges, automatic assembly means have been proposed. An example of such means is described in U. S. Letters Patent 2,765,606, issued on October 9, 1956.

An automatic assembly machine of this type should have various desirable characteristics. Its component parts should be readily disconnectable for sterilization and decontamination. Its structure should be relatively simple for promoting dependable operation and for facilitating maintenance, and it should be compact to minimize the amount of valuable floor space that it occupies.

In accordance with this invention, a machine includes a turntable which has recesses for receiving plungered vials. Intermittent means are provided for rotating the turntable in order to successively position these vials at predetermined stations or operative elements. At these stations, successive operations of filling, capping and sealing the vials are accomplished. A needle-applying device is positioned adjacent the turntable, and conveyor means transfers sealed and filled vials from the turntable to the needle-applying device. After a needle assembly is oriented and attached to the vials, the fully assembled cartridge is discharged to a conveyor which carries the assembled needle to a packaging station, for example.

Novel features and advantages of the present invention will become apparent to one skilled in the art from a reading of the following description in conjunction with the accompanying drawings in which similar reference characters refer to similar parts and in which:

Fig. 1 is an overall schematic plan view of an embodiment of this invention;

Fig. 2 is a view in elevation of a portion of the embodiment shown in Fig. 1;

Fig. 3 is a cross-sectional view in elevation of one element of the embodiment shown in Fig. 1;

Fig. 4 is a cross-sectional view in elevation of another element of the embodiment shown in Fig. 1;

Fig. 5 is a view in elevation of still another element of the embodiment shown in Fig. 1;

Fig. 6 is a plan view of the element shown in Fig. 5;

Fig. 8 is a view in elevation of another portion of the element shown in Figs. 5 and 6;

Fig. 9 is a plan view of still another portion of the element shown in Figs. 5 and 6; and Fig. 10 is a view in elevation partially in cross-section of the portion shown in Fig. 9.

Figure 7:
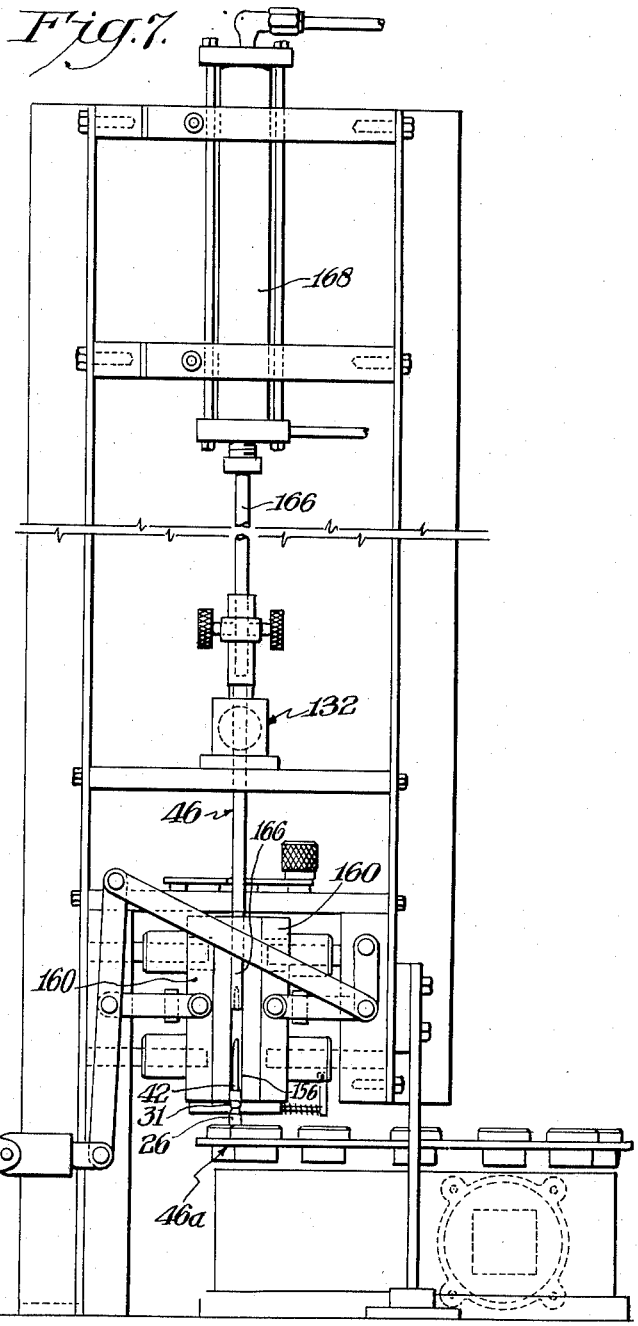
Fig. 7 is an enlarged view in elevation of a portion of the element shown in Figs. 5 and 6.

Fig. 1 shows the overall arrangement of the entire assembly machine. Most of the assembly operations are performed by elements positioned at stations around the periphery of a turntable 10 which includes pockets 12 for receiving and carrying the vials from one station to the next where they are filled, capped, and sealed. Intermittent means 14 are provided for rotating turntable 10 to move each vial from each operative station to the next after a suitable pause. This intermittent mechanism 14 is incorporated for example, in one of the operative elements which is later described in detail.

The stations about the turntable are designated in accordance with their corresponding operative element, followed by suffix "a" and are in successive order: a vial-supplying station 16a, a filling station 18a, a closure-applying station 20a, a sealing station 22a, and an exit station 24a. These stations are equidistantly spaced about the periphery of the turntable so that a vial advances successively from one station to the next on each intermittent movement of the turntable. An indicative portion of the cartridge is associated with each station to indicate the operation performed therein.

A vial 26 including a plunger 28 is shown at vial-supplying station 16a; a vial 26 filled with a liquid medicament 30, for example, is shown at filling station 18a. A closure 31 including a metal cap 32 and a rubber stopper 34 is shown at station 20a where it is applied to the top of a filled vial 26. A sealed vial 26 including a sealed cap 32 is shown at the sealing station 22a.

A needle-applying device 36 is shown adjacent turntable 10 and its associated equipment. A conveying device 38 is shown for transferring filled and sealed vials 26 from the exit station 24a of turntable 10 to needle-applying device 36, and a needle-supplying device 40 provides a steady flow of needle assemblies 42. Means are provided for coordinating the flow of vials and needles so that one needle assembly 42 is applied to each sealed vial 26. This coordinating means, for example, is a second turntable 44 which includes a number of pockets for receiving the sealed vials 26. A needle-orienting and inserting device 46 is positioned at a station 46a of intermittently operating turntable 44. Conveying device 38 deposits a vial 26 at a preceding receiving station 45a of turntable 44. This vial 26 is carried to needle-inserting station 46a where a needle assembly is oriented with respect to the filled vial 26 and attached to it. A completed cartridge 50 is then carried to an exit station 48a where the sealed, filled and needled cartridge 50 is ejected from the machine.

Fig. 2 shows the turntable 10 and components or elements surrounding turntable 10 in elevation to indicate general details of their structure. Sealing device 22 and intermittent means 14 for rotating turntable 10 are incorporated, for example, in an existing sealing machine which is described in Patent 2,507,427, issued May 9, 1950. Intermittently rotating means 14, however, might be incorporated in turntable 10 itself instead of being associated with the sealing components 22.

At station 16a, vials 26 are supplied to the pockets of turntable 10 by means of a vial holder 52 and associated pocketed feeding wheel 54. Vial holder 52 includes a pair of guides 56 which direct the vials to the pockets 58 of feed wheel 54 which rotates at a rate coordinated to deposit one vial 26 through tube 60 into each recess 12 of turntable 10. A counterweighted lever 62 is pivoted at the lower end of the tube 60 to arrest the fall of vials 26 into the pockets 12.

At station 18a, a fill pump 19 with a reciprocating spout 64 fills vials 26, and with spout 64 submerged and withdrawing from vial 26. Pump 19 is connected to a filled reservoir 66 by means of a tube 69. Details of pump 19 will be later described. Fill reservoir 66 is supported above the structure by means of a bracket 68 for example.

At station 20a, closures 31 and stoppers 34 are fed and applied to the vials by means of a vibrating feed channel 70 which is fed from a correspondingly vibrating hopper 72. (Not shown, see Fig. 1.) Details of vibratory apparatus similar to channel 70 are described in Patents 2,187,717 and 2,305,943. In the interests of simplicity, detailed descriptions of these vibrating channels are eliminated from this application.

At exit station 24a, a supply of air is provided by an air supply means 74 which drives sealed, filled vials 26 into the entrance of transfer means 38, a portion of which is shown in Fig. 2.

In the following are described details of the various components shown in Figs. 1 and 2.

In Fig. 3 is shown a pump 19 which moves downward into a vial 26 and simultaneously draws a supply of medicament from reservoir 66 through supply tube 69 and then simultaneously withdraws and fills the vial. Spout 64 of pump 19 starts filling from the bottom of the vial and withdraws and fills while submerged in order to avoid retaining bubbles within the liquid.

Pump 19 includes an outer cylinder or chamber 76 and an inner piston 78. Piston 78 is secured to a bracket 80 by means of a washer 82 and lock nuts 84 which may be adjusted up and down with the external portion of piston 78 in order to vary the stroke of the pump.

The inner piston 78 remains stationary while the outer cylinder 76 is moved upward and downward by means of another cylinder and piston arrangement or air engine 86. Engine 86 includes a cylinder 88 and a piston 90. An air inlet 92 is provided above piston 90 to drive piston 90 and attached cylinder 76 downward and air inlet 94 is provided at the lower portion of the cylinder to drive piston 90 and cylinder 76 upward to discharge liquid and remove spout 64 from the vial. The air control for engine 86 is coordinated with movement of the turntable so that the spout 64 is moved downward into each vial as it is positioned under the pump and withdrawn immediately before the vial proceeds to the next station.

A filled vial 26 is then carried to closure-applying station 20a where a closure-applying element 20, a dispensing conveyor or channel 21 for example, applies a closure 31 which includes a metal cap 32 and a rubber stopper 34. One closure 31 is applied to each of the vials 26 as it passes under the dispensing end of channel element 20. Channel 21 is connected to a vibratory dispensing hopper 72. Channel 21 and hopper 72 incorporate, for example, vibratory dispensing apparatus of the type described in U. S. Letters Patent 2,187,717 and 2,305,943 and are referred to in the art as Syntron dispensers. Closures 31 are successively fed from the bowl or hopper 72 and through channel 21 by the vibratory apparatus associated therewith.

Closures 31 are picked up by the tops of vials 26 as they pass in motion under the dispensing end of the channel 21. The closures 31 are picked up by each of the vials as they contact the closure held in its path by the dispensing end of channel 21. Vials 26, therefore, receive closures 31 before they pause at station 20a. The closure-applying operation is, therefore, different from the other operations which are performed as the vial pauses at an indexed station of the turntable.

From the closure-applying station 20a, vial 26 carrying a closure 31 is indexed to sealing station 22a where the lower skirt of cap 32 is rolled under the lip of vial 26 to seal the filled vial. This sealing operation is accomplished by the sealing head of the container sealing machine or the type described in U. S. Letters Patent 2,507,427, for example. Any type of applicable sealing apparatus, however, may be used to perform this sealing function.

From sealing station 22a, the turntable advances the sealed vial to an exit station 24a where air impelling means 24 discharges the sealed vial from turntable 10. Air discharge means 24 includes a nozzle means 25 positioned directly below a turntable pocket 12 as it arrives at the exit station 24a. A detecting means (not shown) is operatively associated with air ejector means 24 to inactivate air discharge means 24 whenever an imperfect vial arrives at exit station 24a or in the absence of a vial. Imperfect vials are carried through to a scavenging station 27a where a scavenging ejector 27 blows the imperfect vial or its debris through a disposal tube 29.

Sealed vials 26 are conveyed to needle-applying device 36 by means of a conveying device 38 which is a novel pneumatic transfer device, for example. Pneumatic transfer device 38 (Fig. 4) includes an ascending tube 102 having its mouth 103 positioned above a vial 26 at exit station 24a of turntable 10. Ascending tube 102 rises and inclines towards needle-applying device 36 and is joined by a descending tube 104 and ends in a terminal tube 106. Terminal tube 106 is closed by a stopper 108 of a resilient material, rubber for example. Terminal tube 106 is perforated by holes 110 to promote the flow of propelling air through ascending tube 102 to help propel a vial through ascending tube 102 and against stopper or bumper 108.

A trapdoor means 112, a leaf spring for example, is attached to the junction of tubes 102 and 104 so that it permits vials 26 to pass from tube 102 into terminal tube 106 but prevents vials 26 from reentering tube 102 and channels them into descending tube 104. This preserves the vertical orientation of vials 26 and delivers them to receiving station 45a of turntable 44 with sealed caps up, for example. The junction between tubes 102 and 104 is formed by a channeled block 114 including smoothly contoured passageways. Block 114 is formed of a transparent plastic, polyethylene for example, to permit observation of the condition of vials passing therein. Obstructions can accordingly be easily observed and corrected.

Air nozzle means 25 is associated with station 24a to propel the vials through ascending tube 102 as previously described, and another air inlet means 116 is circumferentially arranged about the exit end of descending tube 104 to decelerate vials dropping into receiving station 45a. Air inlet means 116 includes, for example, a number of orifices 118 circumferentially disposed at an upward slant, for example, to provide a rising cushion of air to break the fall of vials 26. An annular chamber 120 connected to a supply of air 122 (a compressed air line for example) evenly distributes a supply of compressed air to orifices 118.

This novel transfer device 38 provides a highly convenient means for transferring vials from exit station of 24a of turntable 10 to receiving station 45a of turntable 44 of needle-applying device 36. Vials 26 are accordingly positioned in a recess or pocket 43 of turntable 44 with the sealed cap facing upward in position to receive a needle assembly.

Figs. 5 and 6 show the relative positions of needle-applying device 36 and the needle-supplying means 40. A sealed vial 26 is received at station 45a of turntable 44 and then carried to station 46a where it is positioned under needle-orienting and inserting device 46. Needle assemblies 42 are supplied to orienting and inserting device 46 by means of a feeding track or channel 130 in conjunction with abstracting unit 132 (later described in detail).

As shown in Figs. 5, 6 and 8, needle assemblies 42 are stored within a rotating drum or hopper 134. Cylindrical hopper 134 is rotated by motor 136 and connected rollers 138 in the direction indicated by arrow 140.

Fig. 8 shows curved ledges 142 attached to the wall of drum 134 which scoop needle assemblies 42 from the lower portion of the drum and carry them upward to the top of the drum where they are dropped into an angular receiving pocket or channel 144. The elongated ends 145 of needle assemblies 42 fall within groove 146 of receiving channel 144 and pass downward along channel 130 to the needle-applying device 36. A vibrator 148 mounted upon the platform 150 supporting the hopper 134 and channel 130 helps induce a flow of needle assemblies 42 down channel 130 to abstracting device 132. This vibratory device 148 is similar to the vibrator associated with channel 21 previously described. Additional needle assemblies 42 are loaded into hopper 134 through its open rear end 152.

In Fig. 5, a needle assembly 42 is shown entering needle-orienting and inserting device 46 after being abstracted from track 130 by tongs 154 of abstracting device 132. Needle assembly 42 falls into chamber 156 of orienting and inserting device 46 with its stopper piercing end 158 extending downward towards the sealed cap of vial 26 at station 46a below it.

Referring to Fig. 7, needle assembly 42 is shown immediately prior to engagement with closure 31 of vial 26. It is accordingly apparent that assembly 42 has dropped downwardly through passage 156 of orienting device 46 and lies directly over the closure 31 of vial 26. Orienting device 46 includes a pair of horizontally reciprocating blocks 160 which include vertical mating recesses 162 which form a continuation of channel 156. These blocks are reciprocated by a pneumatically operated mechanism 164 which moves the blocks 160 together to form a narrowed continuation of channel 156 when a vial is positioned beneath it. These blocks accordingly grasp and securely grasp a vial to uphold it and guide the lower end of a plunger 166 which passes downwardly through channel 156 to engage needle assembly 42 firmly with closure 31 of vial 26. Plunger 166 is operated by means of a pneumatic cylinder 168 which is operated at a predetermined time to apply the needle assembly. Plunger 166 and associated pneumatic drive cylinder 168 have a length of travel sufficiently long to raise the lower end of plunger 166 above the top of chamber 156 where needle assemblies 42 enter. After a needle assembly is firmly engaged with vial 26, blocks 160 open to allow the completed cartridge 50 to pass from the orienting and inserting station 46a to the exit station 48a. Details of a suitable orienting and inserting device are described in U. S. Letters Patent 2,765,467, issued October 9, 1956.

Figs. 9 and 10 show details of the abstracting device 132 which includes a pair of tongs 154 which grasp the hub 170 of a needle assembly 42 as it arrives at the terminal point of track 130. Tongs 154 are pivoted on a block 172 which is reciprocated longitudinally by means of a pneumatic cylinder 146 and rod 176. Hook ends 180 of tongs 154 are urged outwardly by springs 181 reacting against an extension 183 of block 172. Guide pins 178 are positioned at either side along the path of travel of tongs 154 to guide their resilient lateral movement. The outer sides of tongs 154 are tapered so that their extremities are narrower than their bases. When block 172 is at its outer limit of travel the wider roots of tongs 154 contact pins 178 to cause the hooked ends 180 of tongs 154 to move towards each other and grasp hub 170 of needle assembly 42, as shown in Fig. 9. As the block 172 carries tongs 154 towards cylinder 174 the tapered ends of tongs 154 resiliently move outwardly against pins 178 and allow needle assembly 42 to drop within receiving chamber 182. Abstracting device 132 accordingly positively abstracts and deposits a needle assembly 42 within chamber 182 on each operative cycle. A dependable means is thereby provided for supplying a needle assembly 42 to the orienting and inserting device 46 for each vial 26.

After completed cartridge 50 arrives at exit station 48a, it is ejected from the turntable 44 by means of a pneumatic device 200, for example, as shown in Fig. 1. Cartridge 50 may be conveniently ejected upon a conveyor not shown which carries it to the packaging station. The entire assembly device as shown in Fig. 1 is enclosed within a sterile chamber to protect the various components from contamination. The size of this chamber can be held to minimum dimensions to facilitate the sterilization problem. After the components are assembled into a completed cartridge 50, they need no longer be protected from atmospheric contamination because of the inherent protection of the assembled structure 50. These cartridges may, therefore, be carried by a conveyor through suitable air locks to an unprotected area where they may be packaged prior to shipment.

Coordinating means, not shown, are provided for synchronizing the rotation of the turntable and operations of each of the operative units. This unit may be, for example, a motor-operated switch which includes a timer motor and a cam-actuated set of contacts for each device.

What is claimed is:

1. A machine for assembling disposable hypodermic syringes including a plungered and sealed medicament-containing vial and associated sterile needle comprising a turntable including recesses for receiving said vials, intermittent means for rotating said turntable and successively positioning said recesses at predetermined stations, supply means associated with said turntable at an initial station for delivering plungered vials to said recesses, dispensing means associated with said turntable at a following station for filling said vials, closure-applying means associated with said turntable at a further station for placing closures upon said filled vials, sealing means associated with said turntable at a still further station for sealing said closures upon said vials, a needle-applying device disposed adjacent said turntable, conveyor means associated with said turntable and said needle-applying device for transferring sealed vials from said turntable to said needle-applying device, a needle-supplying device operatively associated with said needle-applying device, and said needle-applying device including means for orienting and attaching said needles to said vials.

2. A machine as set forth in claim 1 wherein said needle-applying device includes a second turntable having recesses, and wherein said conveyor means ejects said vials from a recess in said first turntable and delivers them to a recess in said second turntable.

3. A machine as set forth in claim 1 wherein said turntable is an integral portion of said sealing means.

4. A machine as set forth in claim 1 wherein said dispensing means includes a reciprocating spout for filling said vials by means of a submerged stream.

5. A machine as set forth in claim 1 wherein said needle-supplying device includes a channel for guiding needle assemblies to said needle-applying device, a needle-abstracting device connecting the terminal end of channel with said needle-applying device, said needle-abstracting device including a pair of laterally movable tongs and reciprocating means for longitudinally moving said tongs from a position where they grasp an assembly from the terminal end of said channel to a position where they deliver it to said needle-applying means.

6. A machine as set forth in claim 5 wherein said needle-abstracting device includes resilient means urging said tongs away from each other, pin means guiding lateral movement of said tongs, said tongs being tapered to cooperate with said pin means to move said tongs together at the terminal portion of said channel to grasp a needle assembly and to allow said tongs to move apart at a position adjacent said needle-applying device to deliver said assembly to said needle-applying device.

7. A machine as set forth in claim 4 wherein said dispensing means is comprised of a pump including a cylinder and piston, said spout being attached to said cylinder, pneumatic cylinder and piston means being attached to said pump cylinder for moving said cylinder and spout downward to draw a charge of liquid medicament into said pump and to insert said spout within said vial, and said pneumatic cylinder moving said pump cylinder upward to simultaneously fill said vial and withdraw said spout as it fills said vial in a submerged stream.

8. A machine as set forth in claim 1 wherein said conveyor means includes a transfer device having an ascending tube and a descending tube spliced to each other to deliver vials to said needle-applying device with said closures at their upper ends.

9. A machine as set forth in claim 8 wherein said transfer device comprises an ascending tube disposed over an entrance station, a descending tube spliced to said ascending tube at its zenith to form a unitary terminal tube, stopper means sealing the end of said terminal tube, trap door means disposed at the ascending and descending junction of said tubes to permit said vials to pass from said ascending tube and fall into said descending tube after striking said stopper, and pneumatic means for directing a stream of air at a cylindrical object at the mouth of said rising tube to propel it through said device.

10. A machine as set forth in claim 9 wherein said trap door is comprised of a leaf spring attached to the junction of said tubes.

11. A machine as set forth in claim 10 wherein said terminal tube is perforated to promote the flow of air through said rising tube.

12. A machine as set forth in claim 9 wherein air inlet means is circumferentially disposed adjacent the lower end of said descending tube to direct a stream of air radially inward to cushion the fall of vials.

13. A machine as set forth in claim 12 wherein said air inlet means is inclined upwardly.

14. A machine as set forth in claim 13 wherein said air inlet means includes a series of orifices circumferentially disposed about said tube and wherein an annular chamber surrounds said tube and said orifices to provide an evenly distributed supply of air to said orifices.

No references cited.